United States Patent
Rusch et al.

(10) Patent No.: US 11,458,548 B2
(45) Date of Patent: Oct. 4, 2022

(54) MACHINE TOOL, IN PARTICULAR CORDLESS DRILL OR CORDLESS SCREWDRIVER

(71) Applicant: FESTOOL GMBH, Wendlingen (DE)

(72) Inventors: Marc Rusch, Esslingen am Neckar (DE); Peter Seiler, Dornstadt (DE)

(73) Assignee: FESTOOL GMBH, Wendlingen (DE)

( * ) Notice: Subject to any disclaimer, the term of this patent is extended or adjusted under 35 U.S.C. 154(b) by 0 days.

(21) Appl. No.: 17/252,410

(22) PCT Filed: Mar. 4, 2020

(86) PCT No.: PCT/EP2020/055615
§ 371 (c)(1),
(2) Date: Dec. 15, 2020

(87) PCT Pub. No.: WO2020/224824
PCT Pub. Date: Nov. 12, 2020

(65) Prior Publication Data
US 2022/0048119 A1 Feb. 17, 2022

(30) Foreign Application Priority Data
May 8, 2019 (DE) ...................... 10 2019 111 970.7

(51) Int. Cl.
*B25F 5/02* (2006.01)
*B23B 45/02* (2006.01)
(Continued)

(52) U.S. Cl.
CPC ............ *B23B 45/02* (2013.01); *B23B 45/003* (2013.01); *B25F 5/02* (2013.01); *F21V 33/00* (2013.01)

(58) Field of Classification Search
CPC ................................ B25F 5/021; B25B 23/18
See application file for complete search history.

(56) References Cited

U.S. PATENT DOCUMENTS 2,525,588 A * 10/1950 Cameron ................ B25F 5/021
  307/157
6,502,949 B1 * 1/2003 Horiyama .......... B23Q 17/2404
  362/198
(Continued)

FOREIGN PATENT DOCUMENTS

DE  3738563 A1  5/1989
DE  8912224 U1  12/1990
(Continued)

OTHER PUBLICATIONS

German Office Action for Priority Application DE 10 2019 111 970.7, Filed May 8, 2019, dated Jan. 15, 2020, pp. 1-8.
(Continued)

*Primary Examiner* — Eyamindae C Jallow
(74) *Attorney, Agent, or Firm* — George McGuire

(57) ABSTRACT

Handheld power tool having a housing with a machining axis along which a tool is or can be arranged, and having a lighting device that has at least one activatable lamp, the lighting device generating work light within a beam angle with an increased or maximum light intensity in a main emission direction in order to illuminate a work region, and having at least one light sensor for measuring the light intensity, characterized in that the light sensor detects the light intensity of the work light reflected on the work region during operation and generates control signals representing the light intensity, in that an adjustment unit is provided for setting and/or adjusting the work light generated by the lighting device, and in that a control unit is provided which controls the adjustment unit on the basis of the sensor signals during operation.

29 Claims, 2 Drawing Sheets

(51) Int. Cl.
    *B23B 45/00*     (2006.01)
    *F21V 33/00*     (2006.01)

(56)         References Cited

U.S. PATENT DOCUMENTS

| | | | | |
|---|---|---|---|---|
| 6,575,590 | B1* | 6/2003 | Wadsworth | B25F 5/021 |
| | | | | 362/120 |
| 7,185,998 | B2* | 3/2007 | Oomori | B25F 5/021 |
| | | | | 408/16 |
| 10,136,655 | B2* | 11/2018 | Haack | B27G 19/06 |
| 2004/0174699 | A1* | 9/2004 | Minalga | B25B 23/18 |
| | | | | 362/119 |
| 2010/0000094 | A1* | 1/2010 | Lombardo | B23D 59/00 |
| | | | | 30/123 |
| 2014/0166324 | A1* | 6/2014 | Puzio | H01H 25/04 |
| | | | | 173/217 |
| 2015/0283685 | A1* | 10/2015 | Kynast | B25B 21/00 |
| | | | | 362/119 |
| 2021/0362282 | A1* | 11/2021 | Herr | B25F 5/021 |

FOREIGN PATENT DOCUMENTS

| | | | |
|---|---|---|---|
| DE | 10215871 C1 | 10/2003 | |
| DE | 102004032787 A1 * | 2/2006 | ............ B25B 21/00 |
| DE | 102008042652 A1 | 4/2010 | |
| DE | 102014209032 A1 | 7/2015 | |
| DE | 102015226420 A1 | 6/2017 | |
| EP | 1072842 A2 * | 1/2001 | ............ B25F 5/021 |
| EP | 1281486 A1 | 2/2003 | |
| EP | 1072842 B1 | 9/2006 | |

OTHER PUBLICATIONS

International Search Report Form PCT/ISA/210, and Written Opinion Form PCT/ISA/237, International Application No. PCT/EP2020/055615 pp. 1-10 International Filing Date Mar. 4, 2020, search report dated Jun. 26, 2020.

* cited by examiner

MACHINE TOOL, IN PARTICULAR CORDLESS DRILL OR CORDLESS SCREWDRIVER

CROSS-REFERENCE TO RELATED APPLICATION

The present application is the U.S. National Stage application of International Application No. PCT/EP2020/055615 filed Mar. 4, 2020, which relates and claims priority to German Patent Application No. 10 2019 111 970.7, filed May 8, 2019, the entirety of each of which is hereby incorporated by reference.

BACKGROUND

The invention relates to a handheld power tool, in particular an electrically operated handheld power tool, such as a battery screwdriver or a battery drill, comprising a housing, comprising a machining axis along which a tool is or can be arranged, comprising a lighting device that has at least one activatable lamp, the lighting device generating work light within a beam angle with an increased or maximum light intensity in a main emission direction in order to illuminate a work region, and comprising at least one light sensor for measuring the light intensity.

Such a handheld power tool is known, for example, from EP 1 072 842 B1. In this case, a plurality of lamps is arranged on a substantially annular circuit board around the machining axis. Photometers for measuring the intensity of the light are also provided on the circuit board. It has been found that, when using attachment tools which take up a comparatively large amount of installation space, optimal illumination of the work area is no longer ensured with such a handheld power tool. In particular, inconvenient shadows can occur.

U.S. Pat. No. 6,502,949 B1 discloses providing a lighting device having the features of the preamble of claim 1 at the base of the handheld power tool. In this case, a lamp is proposed on a flexible arm, which can be positioned accordingly by the person operating the handheld power tool. Here, the situation whereby the arm takes up a comparatively large amount of installation space, and can get in the way, has proven to be disadvantageous.

Another known handheld power tool is disclosed in U.S. Pat. No. 7,185,998 B2. A manually adjustable lighting device is also disclosed in said document.

The invention is not limited to screwdrivers or drills; rather, it also applies to other handheld tools such as hand milling machines, hand saws, angle grinders or angle drills.

In particular when the lighting device is arranged at the base of the handheld power tool, the distance between the handheld power tool and the work region changes or decreases during the machining process, in particular during a drilling process. Then, if the main emission direction of the work light does not extend along the machining axis, the position and size of the illuminated work region changes as the distance between the handheld power tool and the work plane changes. During the machining process, this results in a changing shadow, which can lead to irritation for the person operating the handheld power tool.

The problem addressed by the present invention is therefore that of providing a handheld power tool which remedies these disadvantages.

SUMMARY OF THE INVENTION

This problem is solved by a handheld power tool having: the light sensor detects the light intensity of the work light reflected onto the work region during operation and generates control signals representing the light intensity; an adjustment unit is provided for setting and/or adjusting the work light generated by the lighting device; and a control unit is provided which controls the adjustment unit on the basis of the sensor signals during operation. By means of the control unit and the adjustment unit, the work light generated by the lighting device and reflected onto the work region can thus be tracked to the machining step so as to result in lighting conditions that are advantageous for the person using the handheld power tool. A plurality of light sensors can be used for this purpose. The work region can be a flat work plane or a region. The adjustment unit can be designed as an electronic component that adjusts the parameters of the work light. It is also conceivable for the adjustment unit to be designed as an actuator or mechanical component in order to adjust the parameters of the work light.

In particular, it is advantageous for the adjustment unit and the lighting device to be designed in such a way that the main emission direction, the beam shape, the beam angle and/or the light intensity of the work light is set or adjusted by means of the adjustment unit, and/or that the number of activated lamps can be set and/or adjusted. As a result, optimal lighting conditions can be provided for the user of the handheld power tool on the basis of the measured light intensity.

It is advantageous for the control unit to be designed such that it controls the adjustment unit during operation in such a way that it adjusts the main emission direction into the region in which the sensor axis of the light sensor and/or the machining axis intersects the work region. This ensures that the main emission direction, i.e. the increased or maximum light intensity of the work light, is always in the region in which the machining process, for example the drilling process when drilling, takes place during the machining process. In particular when the lighting device is provided at the base of the handheld power tool, the region in which the machining process takes place can always be optimally illuminated, even if the distance between the work region and the handheld tool varies. The beam angle can be constant during the machining process. However, it is also conceivable for the beam angle to also be adjusted on the basis of the adjustment of the main emission direction, in order to achieve favorable lighting conditions.

It is also advantageous for the control unit to be designed such that it controls the adjustment unit during operation in such a way that the increased or maximum light intensity of the work light in the work region is constant or largely constant. This also allows favorable lighting conditions to be provided. The background to this is that, if the handheld power tool approaches the work region during the machining process, the light intensity in the work region increases due to the approaching lighting device. The closer the handheld power tool comes to the work region, the brighter the work region is illuminated. In order to avoid unfavorable glare, the invention allows for the light intensity to be constant or largely constant during the entire machining step, as a result of which undesired glare can be prevented.

According to the invention, it is also conceivable for the light sensor and/or at least one further light sensor to detect the intensity of the ambient light and for the control unit to be designed such that it controls the adjustment unit on the basis of the ambient light during operation. In this way, sufficient work light can be made available depending on the intensity of the ambient light present. If there is already sufficient ambient light, no light is made available via the lighting device, as a result of which glare can be avoided and battery power can also be saved.

In order to adjust the work light, the lighting device and/or the at least one lamp can be arranged such that it can be pivoted at least about one pivot axis. In particular, the adjustment unit can pivot about the at least one pivot axis. It is advantageous here if the pivot axis extends preferably perpendicularly to the machining axis such that, when pivoting about the pivot axis, the main emission direction always intersects the machining axis. By providing such a pivot axis, the work light can consequently be tracked to the target region in the work area, i.e. the region where the handheld power tool interacts with the work plane, when the distance between the handheld power tool and the work plane varies.

It is also advantageous if the handheld power tool has optics for influencing the work light. The optics can include lenses, prisms and/or reflectors and are preferably designed in such a way that they can be used to adjust the main emission direction, the beam angle and/or the light intensity.

The light sensor is advantageously arranged in or on the housing in such a way that the sensor axis of the light sensor is located in or near the machining axis. This ensures that the light sensor can be used to safely monitor the work plane in the region where machining takes place. The sensor axis of the light sensor is preferably arranged in parallel with the machining axis, close to the machining axis or so as to extend in the machining axis. The light sensor or its sensor axis can, however, also be spaced apart from the machining axis and/or designed to intersect same, with a corresponding correction calculation then having to be carried out to determine the light intensity along the machining axis.

It is conceivable for a plurality of light sensors to be arranged around the machining axis so that the machining axis lies in the detection regions thereof. The light sensors are preferably arranged symmetrically around the machining axis.

It is also advantageous if the sensor axis of the at least one light sensor can be aligned manually with a target region in the work region. The increased or maximum light intensity of the work light is then automatically directed to the target region, even if the handheld power tool changes its position. As a result, the person using the handheld power tool can specify a target region that is also illuminated during the machining process.

According to another advantageous embodiment of the invention, the lighting device is designed to project information onto the work region. In particular, it is conceivable that the lighting device is designed as a digital projector (beamer) so that the information can be projected onto the work region. The information can be a safety notice, for example. It is conceivable for the person using the handheld power tool to be informed that drilling is not permitted in a certain region; in this case, the safety notice could be: "Warning: do not drill here." It is also conceivable that machine states, such as the charge state of a rechargeable battery, the machine temperature, wear states or the like, are projected onto the work region by means of the lamps. Operating instructions or extracts from a manual can also be displayed accordingly.

The at least one light sensor can comprise a photodiode, a photoresistor and/or CCD sensors or can be designed as a camera comprising CCD sensors. A plurality of light sensors is preferably provided in order to be able to provide a redundant system.

An advantageous handheld power tool is obtained when the housing has a handle portion and a base, the tool being provided on the side of the handle portion remote from the base, and the lighting device being arranged in or on the base.

As already stated at the outset, the handheld power tool can in particular be designed as a cordless screwdriver or as a cordless drill, it then being possible to arrange the rechargeable battery in the base or on the base.

The above-mentioned problem is also solved by a method for operating a handheld power tool, in particular a handheld power tool according to the invention, the sensor axis of the light sensor being directed to a target region in the work area, the lighting device illuminating the work region and thus being set or adjusted, and the main emission direction being directed to the target region. This ensures that the target region, i.e. preferably the region in which the machining takes place, is always optimally illuminated. The target region can be the region where the machining begins in the work region, for example. In the drilling process, for example, the target region is the region where the drill is placed onto the work plane or where it dips into the work plane.

Further details and advantageous embodiments of the invention can be found in the following description, on the basis of which one embodiment of the invention shall be described and explained in more detail.

DETAILED DESCRIPTION

Figure 1:
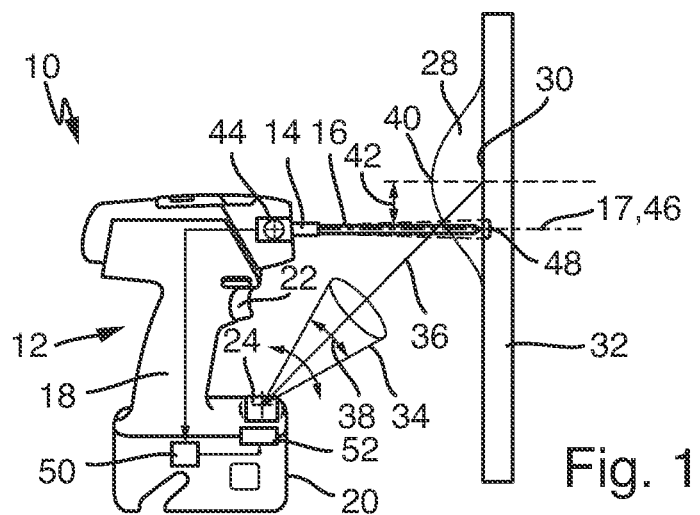
FIG. 1 shows a handheld power tool according to the invention in a first machining position.
Figure 2:
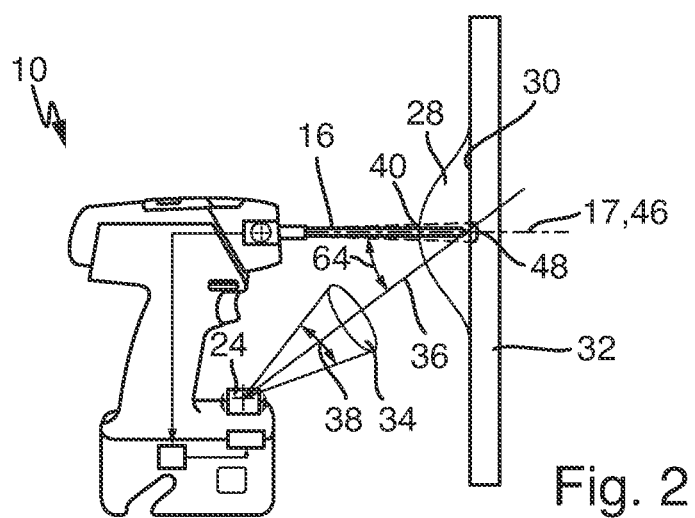
FIG. 2 shows the handheld power tool according to FIG. 1 in a second work position.
Figure 3:
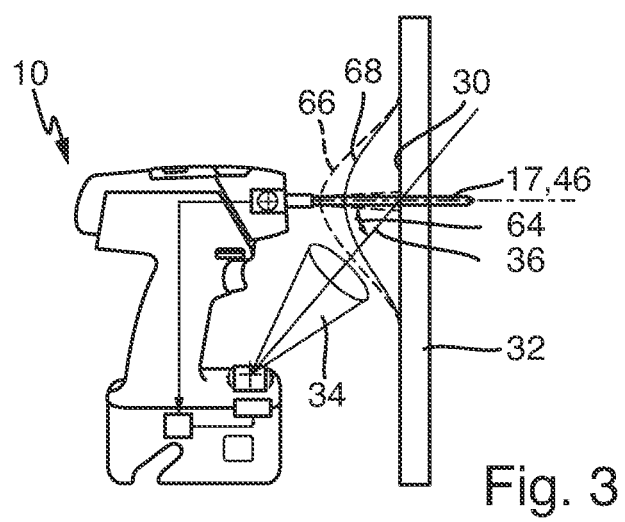
FIG. 3 shows the handheld power tool according to FIG. 1 in a third work position.

The handheld power tool 10 shown in FIGS. 1 to 3 in the form of a cordless battery screwdriver comprises a housing 12 with a tool holder 14 for receiving a tool along a machining axis 17, in this case for receiving a drill 16. Instead of the drill 16, other tools such as screw attachments, polishing attachments or the like can of course also be used. The tool holder 14 can be a plug-in holder, a drill chuck or any other tool holder.

The housing 12 has a handle portion 18 and a base 20 in which a rechargeable battery is housed. A motor (not shown) and a gear unit for driving the tool holder 14 or the drill 16 are provided within the housing 12. The motor can be controlled via a pressure switch 22.

Figure 4:
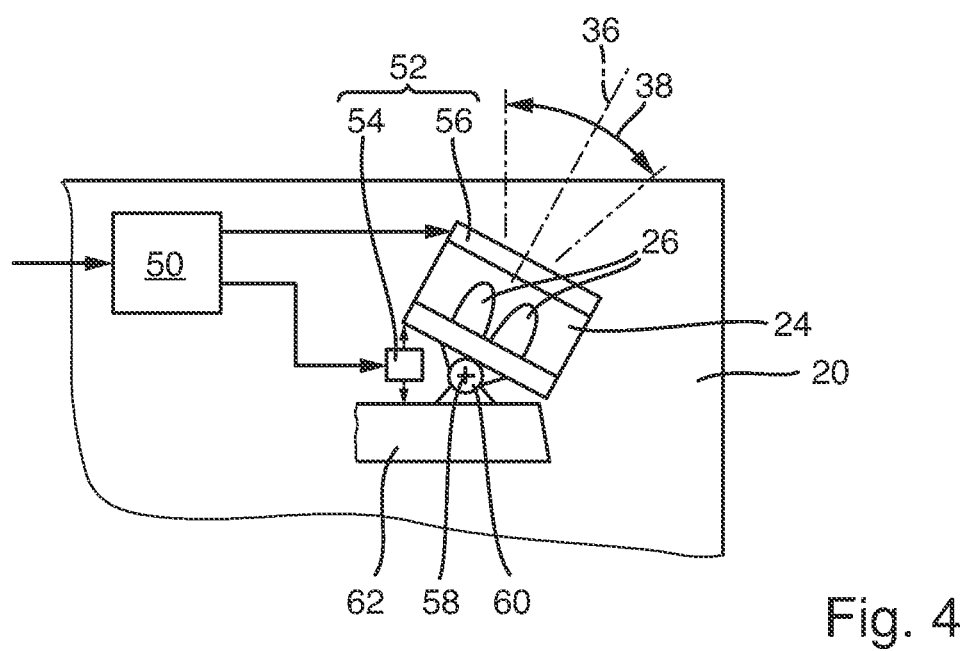
FIG. 4 schematically shows an enlarged section of the handheld power tool according to FIG. 1.

As is clear from FIGS. 1 to 3, a lighting device 24 with lamps 26 is provided on the base 20, which can be seen in the section according to FIG. 4. The lighting device 24 with the lamps 26 is used to provide work light 28 within a work region 30. The work region 30 can be a largely flat surface such as the surface of a wall 32, for example.

In order to illuminate the work region 30, the lighting device 24 generates a light cone 34 which extends around a main emission direction 36. The light cone 34 encloses a beam angle 38. The work light 28 has an increased light intensity in the main emission direction 36, which should be made clear in FIGS. 1 to 3 by the maximum of the schematically indicated light distribution of the work light 28. In the view according to FIG. 1, the increased light intensity 40 is not in the region in which the tip of the drill 16 acts against the work region 30 (target region); rather, it is offset by the amount 42.

The handheld power tool 10 further comprises a light sensor 44 for measuring the light intensity in the work region 30. The light sensor 44 is preferably arranged such that its sensor axis 46 extends along the machining axis 17.

The light sensor 44 is also designed in such a way that it has a comparatively small detection region 48, extending along a sensor axis 46, for detecting the light intensity.

Even if only one light sensor 44 is provided in FIGS. 1 to 3, it is conceivable to arrange a plurality of light sensors, in particular around the machining axis 17 on the housing 12. The light sensors 44 are also used to detect the light intensity in the detection region 44.

During operation, the light sensor 44 is used, as already mentioned, to detect the work light 28 reflected on the work region 30. The light sensor 44 generates sensor signals which represent the light intensity and are fed to a control unit 50. The control unit 50 is used to control an adjustment unit 52, by means of which the lighting device 24 is controlled on the basis of the sensor signals generated by the light sensor 44. By means of the adjustment unit, the lighting unit 24 can be set or adjusted in such a way that the main emission direction 36, the beam angle 38, the light intensity of the work light 28 and/or the number of activatable lamps 26 can be set and/or adjusted.

The adjustment unit 52 can comprise a plurality of actuators. According to the schematic view in FIG. 4, the adjustment unit 52 comprises an adjustment drive 54 and adjustment optics 56, for example. By means of the adjusting drive 54, for example, the lighting device 24 can be pivoted about a pivot axis 58, the pivot axis 58 preferably being arranged so as to extend perpendicularly to the machining axis 17. By pivoting the lighting device 24, the main emission direction 36 can be adjusted with respect to the power tool 10 or with respect to the work region 30. According to the invention, it is also conceivable for the lighting device 24 to be arranged so as to be pivotable not only about one pivot axis 58, but rather about a plurality of pivot axes. For this purpose, it is conceivable that the lighting device 24 is mounted on a carrier 62 via a correspondingly suitable joint 60, for example a ball joint.

The adjustment optics 56 can in particular contain lenses, prisms and/or reflectors and can preferably be designed such that the beam angle 38 and the beam shape can be adjusted.

The adjustment unit 52 can also be designed such that the intensity of the work light 28 generated by the lamps 26 can be adjusted.

The control unit 50 is designed such that, during operation, it controls the adjustment unit 52 in particular such that the main emission direction 36 is adjusted into the detection area 48 surrounding the sensor axis 46 of the light sensor 44, as shown in FIG. 2. The distance 42 between the increased light intensity 40 of the work light 28 and the sensor axis 46, and thus the machining axis 17, is minimized and is preferably zero.

During operation of the handheld power tool 10, this can be achieved as follows. As shown in FIG. 1, the handheld power tool 10 is placed with the tip of the drill 16 onto the work region 30. The light sensor 44 is directed to the detection region 48, which represents a target region in which an increased light intensity is to be provided in the work region 30. In a next step, the lamp 26 illuminates the conceivable work region 30, for example by pivoting the lighting device 24 about the pivot axis 58 from one pivot end position to another pivot end position. The area of increased light intensity 40 is thus moved over the entire conceivable work region. While the work light 28 is moving over the entire work region 30, the light sensor 44 detects the light intensity in the detection region 48. During this calibration process, the setting of the lighting device 24, in which the light sensor 44 detects the maximum light intensity 40, can thus be determined. In this setting, there are thus optimal lighting conditions in the target region of the work region 30, i.e. in the region in which the main emission direction 36 is directed to the detection region 48, or in the region in which the main emission direction 36 intersects the sensor axis 46. As is clear from FIG. 2, the maximum light intensity 40 then lies in the machining axis 17 or in the sensor axis 46.

As a result, it can be ensured that the optimal light distribution, i.e. the region of increased light intensity 40, is adjusted into the target region in which the drill 16 acts against the work region 30. The adjustment takes place automatically without the involvement of the person guiding the handheld power tool 10.

During the machining process, the drill 12 penetrates into the work region 30 or into the wall 32, which is shown in FIG. 3. This changes the distance between the handheld power tool 10 and the work region 30. The control unit 50 is now designed such that it controls the adjustment unit 52 during the machining process in such a way that the work light 28, and in particular the main emission direction 38, remains in the detection region 48 in the work region. Consequently, the closer the handheld power tool 10 comes to the work region, the greater the angle 64 between the sensor axis 46 and the main emission direction 36. The light emitted by the lighting device 24 is consequently tracked so that optimal lighting conditions prevail in the detection region 48 or in the region in which the sensor axis 46 intersects the work region 30.

Due to the handheld power tool 10 approaching the work region 30 during the machining process, the light intensity of the work light 28 in the work region 30 also increases. The closer the lighting device 24 comes to the work region 30, the brighter the work light reflected there becomes. The dashed line 66 in FIG. 3 shows the increased light intensity which would result if the handheld power tool 10 is brought closer to the work region 30, without the light intensity of the light emitted by the lamps 26 being adjusted. In order to counteract this, the lamps 26 are controlled by the control unit 50 in such a way that the closer the handheld power tool 10 comes to the work region 30, the less the intensity of the emitted light. As a result, an overall constant light intensity is achieved during the entire machining process, as indicated in FIG. 3 with the solid line.

A further light sensor, which is used to detect the ambient light, can also be provided on the handheld power tool 10. Depending on the brightness of the ambient light, the control unit 50 can thus control the lamps 26 in such a way that optimal illumination can be provided on the basis of the ambient light. In this way, glare affecting the person operating the handheld power tool can be avoided in particular.

The light sensor 44 is arranged so as to be adjustable. The sensor axis of the light sensor 44 or the detection area 48 of the light sensor 44 can thus be moved to another point in the work region 30. This has the consequence that this target region, or the detection region 48 of the light sensor, is optimally illuminated during machining, since the main emission direction 36 is then aligned with this target region during the machining process.

The lighting device 24 can also be designed as a digital projector in order to display information on the work region 30. The information can be a safety notice or operating instructions for the handheld power tool, for example. It is also conceivable to display the machine states, the charge state of the rechargeable battery, the machine temperature and the like.

The at least one light sensor can be designed, for example, as a photodiode, photoresistor or as CCD sensors.

The invention claimed is:

1. A handheld power tool,
comprising a housing having a machining axis,
wherein a tool is arrangeable along the machining axis
a lighting device having at least one activatable lamp, wherein the lighting device generating generates work light within a beam angle with an increased or maximum light intensity in a main emission direction in order to illuminate a work region,
a light sensor for measuring the light intensity, wherein the light sensor detects the light intensity of the work light reflected from the work region during an operation and generates control signals representing the light intensity,
an adjustment unit for setting and/or adjusting the work light generated by the lighting device, and
a control unit for controlling the adjustment unit on the basis of the sensor signals during the operation,
wherein the adjustment unit and the lighting device are designed such that the main emission direction is set or adjusted by means of the adjustment unit.

2. The handheld power tool according to claim 1, wherein the adjustment unit and the lighting device are designed such that the light intensity of the work light is settable or adjustable by means of the adjustment unit.

3. The handheld power tool according to claim 1, wherein the control unit is designed such that the control unit controls the adjustment unit during the operation such that the main emission direction is adjusted into the target region, wherein the sensor axis of the light sensor or the machining axis intersects the work region.

4. The handheld power tool according to claim 1, wherein the control unit is designed such that the control unit controls the adjustment unit during the operation such that the increased or maximum light intensity of the work light in the work region is constant or largely constant.

5. The handheld power tool according to claim 1, wherein the light sensor or at least one further light sensor detects the intensity of the ambient light, wherein the control unit is designed such that the control unit controls the adjustment unit on the basis of the ambient light during the operation.

6. The handheld power tool according to claim 1, wherein the lighting device is arranged such that the lighting device is pivotable at least about one pivot axis in order to adjust the main emission direction.

7. The handheld power tool according to claim 1, characterized in that optics are provided for influencing the work light.

8. The handheld power tool according to claim 1, wherein the light sensor is arranged in or on the housing, and wherein the sensor axis of the light sensor is located in or near the machining axis.

9. The handheld power tool according to claim 1, wherein a plurality of light sensors is arranged around the machining axis so that the machining axis lies in the detection regions thereof.

10. The handheld power tool according to claim 1, wherein the sensor axis of the one light sensor is manually alignable with a target region in the work region.

11. The handheld power tool according to claim 1, characterized in that the lighting device is designed to project information onto the work region.

12. Handheld power tool according to claim 1, wherein the light sensor comprises at least one photodiode, a photoresistor or CCD sensors or is designed as a camera comprising CCD sensors.

13. The handheld power tool according to claim 1, wherein the housing has a handle portion and a base, wherein the tool is provided on the side of the handle portion remote from the base, and wherein the lighting device is arranged in or on the base.

14. The handheld power tool according to claim 13, wherein the handheld power tool is designed as a battery screwdriver or a battery drill, wherein a rechargeable battery is arranged in or on the base.

15. A method for operating a handheld power tool, the handheld power tool comprising a housing having a machining axis,
wherein a tool is arrangeable on the machining axis,
a lighting device having at least one activatable lamp,
wherein the lighting device generates work light within a beam angle with an increased or maximum light intensity in a main emission direction in order to illuminate a work region, a light sensor for measuring the light intensity,
wherein the light sensor detects the light intensity of the work light reflected from the work region during an operation and generates control signals representing the light intensity,
an adjustment unit is provided for setting or adjusting the work light generated by the lighting device, and
a control unit for controlling the adjustment unit on the basis of the sensor signals during the operation,
wherein a sensor axis of the light sensor is directed to a target region in the work area, and
wherein the lighting device illuminates the work region, and wherein the sensor axis is adjusted such that the main emission direction is directed towards the target region.

16. A handheld power tool comprising:
a housing having a machining axis, wherein a tool is arrangeable on the machining axis,
a lighting device having at least one activatable lamp, wherein the lighting device generates work light within a beam angle with an increased or maximum light intensity in a main emission direction in order to illuminate a work region,
a light sensor for measuring the light intensity, wherein the light sensor detects the light intensity of the work light reflected from the work region during an operation and generates control signals representing the light intensity,
an adjustment unit is provided for setting or adjusting the work light generated by the lighting device, and
a control unit for controlling the adjustment unit on the basis of the sensor signals during the operation,
wherein the adjustment unit and the lighting device are designed such that a beam shape or the beam angle is set or adjusted by means of the adjustment unit.

17. The handheld power tool according to claim 16, wherein the adjustment unit and the lighting device are designed such that the light intensity of the work light is settable or adjustable by means of the adjustment unit.

18. The handheld power tool according to claim 16, wherein the control unit is designed such that the control unit controls the adjustment unit during the operation such that the main emission direction is adjusted into the target region, wherein the sensor axis of the light sensor or the machining axis intersects the work region.

19. The handheld power tool according to claim 16, wherein the control unit is designed such that the control unit controls the adjustment unit during the operation such that the increased or maximum light intensity of the work light in the work region is constant or largely constant.

20. The handheld power tool according to claim 16, wherein the light sensor or at least one further light sensor detects the intensity of the ambient light, wherein the control unit is designed such that the control unit controls the adjustment unit on the basis of the ambient light during the operation.

21. The handheld power tool according to claim 16, wherein the lighting device is arranged such that the lighting device is pivotable at least about one pivot axis in order to adjust the main emission direction.

22. The handheld power tool according to claim 16, wherein optics are provided for influencing the work light.

23. The handheld power tool according to claim 16, wherein the light sensor is arranged in or on the housing, and wherein the sensor axis of the light sensor is located in or near the machining axis.

24. The handheld power tool according to claim 16, wherein a plurality of light sensors is arranged around the machining axis so that the machining axis lies in the detection regions thereof.

25. The handheld power tool according to claim 16, wherein the sensor axis of the light sensor is manually alignable with a target region in the work region.

26. The handheld power tool according to claim 16, wherein the lighting device is designed to project information onto the work region.

27. The handheld power tool according to claim 16, wherein the light sensor comprises at least one photodiode, a photoresistor or CCD sensors or is designed as a camera comprising CCD sensors.

28. The handheld power tool according to claim 16, wherein the housing has a handle portion and a base, wherein the tool is provided on the side of the handle portion remote from the base, and wherein the lighting device is arranged in or on the base.

29. The handheld power tool according to claim 28, wherein the handheld power tool is designed as a battery screwdriver or a battery drill, wherein a rechargeable battery is arranged in or on the base.

* * * * *